(12) United States Patent
De Nicolo

(10) Patent No.: US 6,308,240 B1
(45) Date of Patent: *Oct. 23, 2001

(54) POWER MANAGEMENT SYSTEM FOR MODULAR ELECTRONICS

(75) Inventor: Maurilio Tazio De Nicolo, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/629,489

(22) Filed: Jul. 31, 2000

Related U.S. Application Data

(63) Continuation of application No. 09/041,838, filed on Mar. 12, 1998, now Pat. No. 6,134,666.

(51) Int. Cl.⁷ .......................................... G06F 1/26
(52) U.S. Cl. ..................... 710/300; 710/340; 710/330
(58) Field of Search ............................ 710/300, 340, 710/330

(56) References Cited

U.S. PATENT DOCUMENTS

| | | | |
|---|---|---|---|
| 3,586,980 | 6/1971 | Krausser | 325/349 |
| 4,599,494 | 7/1986 | Welty | 179/84 |
| 4,626,954 | 12/1986 | Damiano et al. | 361/96 |
| 4,644,348 | 2/1987 | Gerety | 340/825.06 |
| 5,122,691 | * 6/1992 | Balakrishnan | 307/475 |
| 5,574,726 | 11/1996 | Chan et al. | 370/85.3 |
| 5,613,130 | * 3/1997 | Teng et al. | 713/310 |
| 5,671,249 | 9/1997 | Andersson et al. | 375/211 |
| 5,710,931 | * 1/1998 | Nakamura et al. | 713/310 |
| 5,717,714 | 2/1998 | Andersson et el. | 375/213 |
| 5,726,506 | * 3/1998 | Wood | 307/147 |
| 5,737,616 | * 4/1998 | Watanabe | 713/340 |
| 5,758,102 | * 5/1998 | Carey et al. | 710/103 |
| 5,790,873 | * 8/1998 | Popper et al. | 713/320 |
| 5,796,185 | * 8/1998 | Takata et al. | 307/140 |
| 5,802,379 | * 9/1998 | Boatwright et al. | 713/324 |
| 5,809,256 | * 9/1998 | Najemy | 710/103 |
| 5,845,142 | * 12/1998 | Hayasaka | 713/340 |
| 5,884,233 | * 3/1999 | Brown | 702/61 |
| 6,115,468 | 9/2000 | De Nicolo | 379/413 |
| 6,134,666 | 10/2000 | De Nicolo | 713/300 |

* cited by examiner

Primary Examiner—Robert Beausoleil
Assistant Examiner—Raymond N Phan
(74) Attorney, Agent, or Firm—Thelen Reid & Priest LLP; David B. Ritchie

(57) ABSTRACT

Each modular processor card of a modular electronic system carries a component defining its maximum current or power requirements. The component, which may be a resistor, capacitor, serial access memory, or the like, is accessible over a single conductor through a backplane by a power supervisor. The supervisor will determine the current/power requirements of a processor card while the card is substantially powered off. The supervisor may then weigh existing power supply resources of the modular electronic system with existing current/power demand and make a decision to allow power-up of the card if sufficient overhead is available, or, alternatively, make a decision to deny power-up of the card if insufficient additional current/power resources are available. An optional message indicating the outcome of the decision can be transmitted to a user. If the supervisor elects to power up the card, a signal sent on the conductor connecting the card to the supervisor may be used to authorize the card to power up and control circuitry to effect the power up.

19 Claims, 3 Drawing Sheets

POWER MANAGEMENT SYSTEM FOR MODULAR ELECTRONICS

This application is a continuation of Ser. No. 09/041,838 filed Mar. 12, 1998 U.S. Pat. No. 6,134,666.

BACKGROUND OF THE INVENTION

1. Field of the Invention

The present invention is directed to a method and apparatus which permit a power supervisor in a multi-card modular electronic system to turn on or off power to a given modular processor card based upon considerations of the power needed by the card and the power resources available to the modular electronic system.

2. The Background Art

Multi-card modular electronic systems are common in the computer industry. Typically such systems comprise a back plane having a plurality of connectors to which a number of line cards or processor cards are connected. Processor cards may perform any of a number of functions as well known to those of ordinary skill in the art. The back plane provides electrical interconnections to the processor cards, such as data, power, ground and signalling. Such systems usually include at least one supervisor module which may be on one of the processor cards or may be permanently connected to the back plane. Supervisor modules are commonly used to detect errors and report conditions to a user.

It is desirable to build modular systems which provide for future expansion while providing a relatively low entry cost. In systems employing processor cards which consume significant quantities of power, such as those embodying one or more microprocessors, or equivalently power hungry devices, it may be desirable to provide for modular power supplies which may be added or changed as power requirements increase with the addition of is more processor cards or the substitution of higher power consumption processor cards for lower power consumption processor cards.

In such systems, it is frequently a problem that an individual responsible for such systems may inadvertently place too high a power demand upon a particular power supply configuration of such a system through the addition of a particular processor card to a previously functioning system. The consequences can vary from a simple shut down or an inability to start up to equipment damage. Accordingly, it would be desirable to provide a method and apparatus which could simply protect such systems from the consequences of errors made by inadvertently overlooking available power supply resources in such modular electronic systems.

As back plane conductor lines are a relatively scarce and expensive resource in such systems, it would also be desirable to implement such method and apparatus in a manner which makes a minimum use of such scarce resources.

SUMMARY OF THE INVENTION

Each modular processor card of a modular electronic system carries a component defining its maximum current or power requirements. The component, which may be a resistor, capacitor, serial access memory, or the like, is accessible over a single conductor through a backplane by a power supervisor. The supervisor will determine the current/power requirements of a processor card while the card is substantially powered off. The supervisor may then weigh existing power supply resources of the modular electronic system with existing current/power demand and make a decision to allow power-up of the card if sufficient overhead is available, or, alternatively, make a decision to deny power-up of the card if insufficient additional current/power resources are available. An optional message indicating the outcome of the decision can be transmitted to a user. If the supervisor elects to power up the card, a signal sent on the conductor connecting the card to the supervisor may be used to authorize the card to power up and control circuitry to effect the power up.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
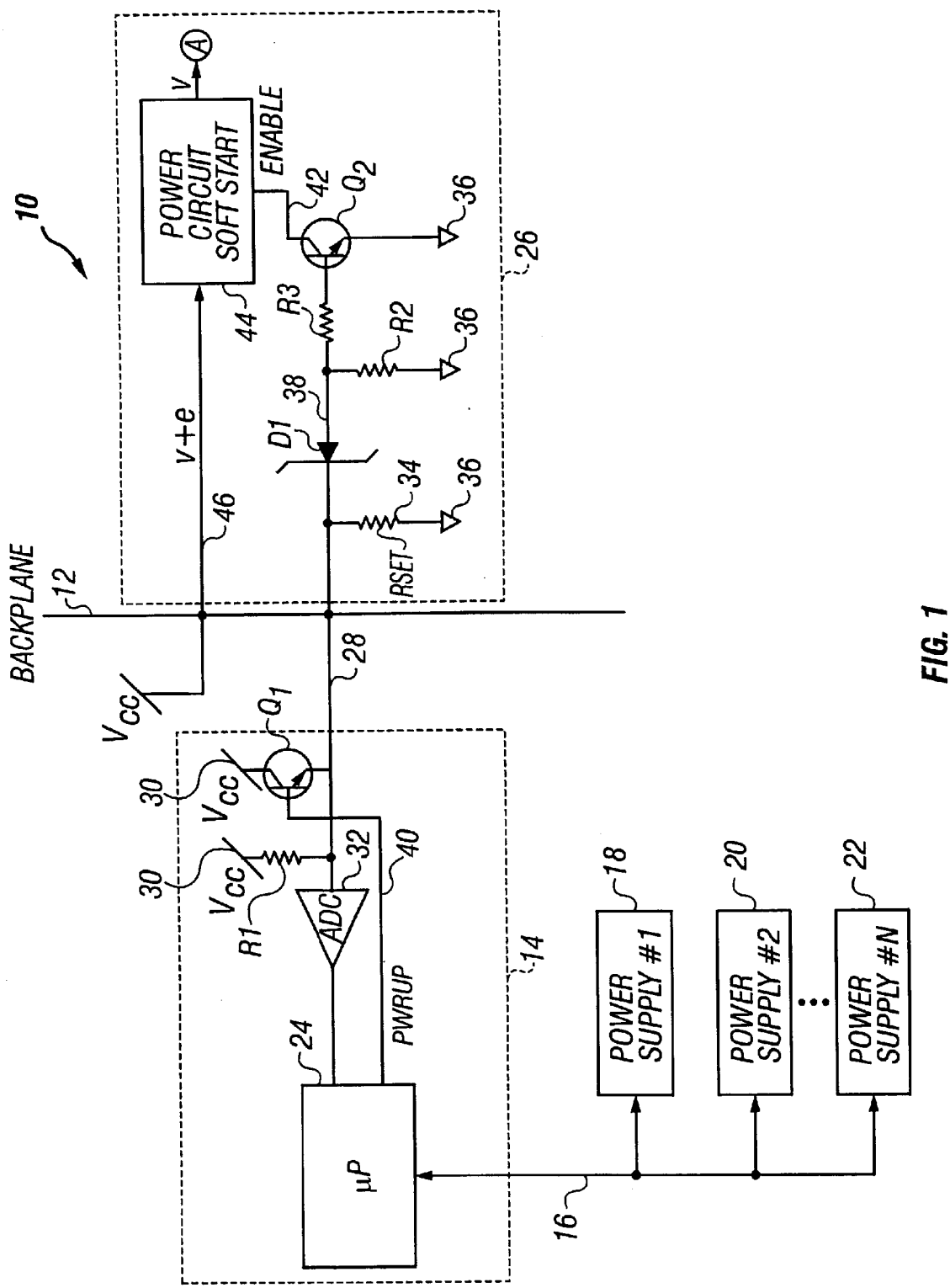
FIG. 1 is an electrical schematic diagram of a presently preferred embodiment of the present invention.

Turning to FIG. 1, a presently preferred embodiment of the present invention is shown. In accordance with the present invention, a modular electronic system 10, such as computer communications equipment, has a backplane connector strip 12 which provides electrical interconnections among a plurality of electronic modules or cards which are electrically attached to it (e.g., plugged into it). The invention will work with one or more electronic modules.

In such modular electronic systems, one or more power supplies may be provided having certain power or current delivery capabilities. To render such systems more flexible, a plurality of positions can be provided into which such power supplies may be installed. The problem is that given a very flexible level of power supply resources and a very flexible level of power demand posed by the electronic modules which may be attached to the backplane, the modular electronic system now must monitor both its resources and its power demand to insure that there is no shortfall of power which might cause system unreliability or failure.

In accordance with a presently preferred embodiment of the present invention, a power supervisor 14 is provided. The power supervisor 14 has a communications link 16 to one or more power supplies 18, 20, 22 which communicates information defining available power resources to a microprocessor 24 of power supervisor 14. This communication may be carried out in any of a number of ways.

According to a presently preferred embodiment of the present invention, each power supply module 18, 20, 22 may have stored in it a relatively permanent memory having a three (or more) bit identification code that can be read by power supervisor is 14 over communications link 16. Each power supply 18, 20, 22 will have its proper predefined identification code set at the time of its manufacture to a value unique for its model and/or indicative of its maximum ability to supply power or current. In typical use the power supervisor 14 will read the identification code at power up,, and/or at any time that the power supply module 18, 20, 22 is inserted into or attached to power supervisor 14. Power supervisor 14 then takes the identification code for the power supply module, and if necessary, looks up in a table associated with power supervisor 14 the identification code in order to determine a power output value for the power supply.

In an alternative preferred embodiment, in order to provide more information without relying on software tables embedded in power supervisor 14, a serial EEPROM is used in each power supply module 18, 20, 22. The serial EEPROM is preferably programmed at the time of manufacture of the power supply module with information apropos of the power supply module, e.g., output voltages, input voltages, current levels, operating characteristics, model, type, serial number, manufacturer, and the like. This information is then read at power up, or at insertion or attachment of the power supply module to power supervisor 14 so that power supervisor 14 is fully advised of the operating characteristics of the power supply modules attached to it and can act on that information. A benefit of this latter approach is that new power supply modules can be created after power supervisor 14 is fixed and installed and power supervisor 14 can still make full use of the information encoded in the serial EEPROM without any need for an upgrade or software update to the power supervisor. Other non-volatile memory devices could also be used instead of the serial EEPROM discussed above, as would be understood by those of ordinary skill in the art. Preferably such devices would use a single bit data path in order to minimize connections between power supervisor 14 and power supply modules 18, 20, 22.

Electronic module 26 attaches to backplane 12. Each electronic module will have a particular power requirement. Obviously the power demand of module 26 will fluctuate depending upon what it is doing at a particular moment, but it will have a known maximum power requirement or demand which can be thought of as the worst case power requirement. It is this known maximum power requirement that must be communicated to power supervisor 14.

In accordance with a presently preferred embodiment of the present invention, the maximum power requirement is communicated by an analog voltage signal on a query conductor 28 passing from electronic module 26 through backplane 12 to power supervisor 14. Query conductor 28 is connected to a first source of a voltage, such as Vcc 30 through resistor R1 which may be a 100 ohm resistor. Analog to digital converter 32 converts the voltage on query conductor 28 to a digital value for use by programmed microprocessor 24. A component, such as an impedance element, which may be a resistor, Rset 34, disposed between query conductor and a source of a second voltage 36, such as ground, encodes a voltage signal on query conductor 28, the voltage being a function of the resistance of resistor 34. For example, Rset 34 could be 25 ohms if power demand of the module is 5 amperes, 50 ohms if 10 amperes, 75 ohms if 15 amperes, and 100 ohms if 20 amperes.

The voltage drop between Vcc 30 and query line 28 through R1 is selected to be sufficient to prevent current flow through zener diode D1, thus isolating the portion of the circuitry of module 26 connected to the anode 38 of zener diode from query line 28.

If microprocessor 24 decides that sufficient power resources are available to permit module 26 to be turned on with its now known maximum power requirement, then microprocessor 24 sends a signal "PWRUP" on line 40 to a switch shown here as transistor Q1. The presence of the PWRUP signal on the control gate of transistor Q1 permits current to flow through Q1 from Vcc to query line 28. This voltage, not dropping through resistor R1, will cause a higher voltage to obtain on query line 28. This voltage will be selected to be above the threshold of zener diode D1. In turn, current will flow through resistors R2 and R3 providing a signal on a control gate of transistor Q2 which assumes the role of a switch. When this current flows, Q2 will turn on and provide an ENABLE signal on line 42 to power circuit soft start 44.

Figure 2:
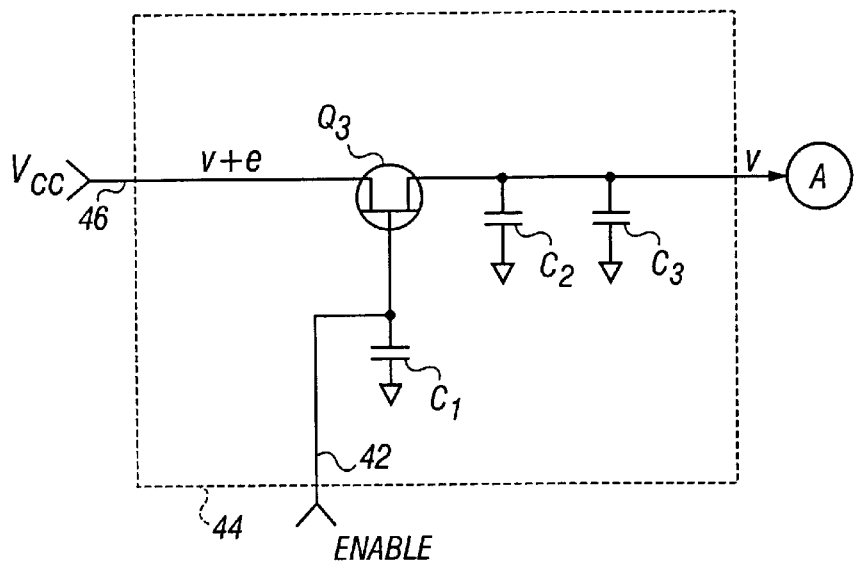
FIG. 2 is an electrical schematic diagram of a typical power soft start circuit for use in conjunction with a presently preferred embodiment of the present invention.

Power circuit soft start 44 operates in a conventional manner, such as that shown in FIG. 2, to slowly turn on power available on line 46 and apply it to the power consuming circuitry of module 26 denoted "A" while the ENABLE signal is asserted on line 42. Note that "A" will be provided with a slightly lower voltage "V" than Vcc (V+e) available at backplane 12 due to the voltage drop (e) through transistor Q3 which is preferably a power MOSFET. C1 is preferably 0.1 uF and C2 and C3 are filter capacitors chosen based upon the application. The circuit shown in FIG. 2 is for reference only. An actual implementation would likely contain additional components needed to control the power slope as known to those of ordinary skill in the art.

Figure 3:
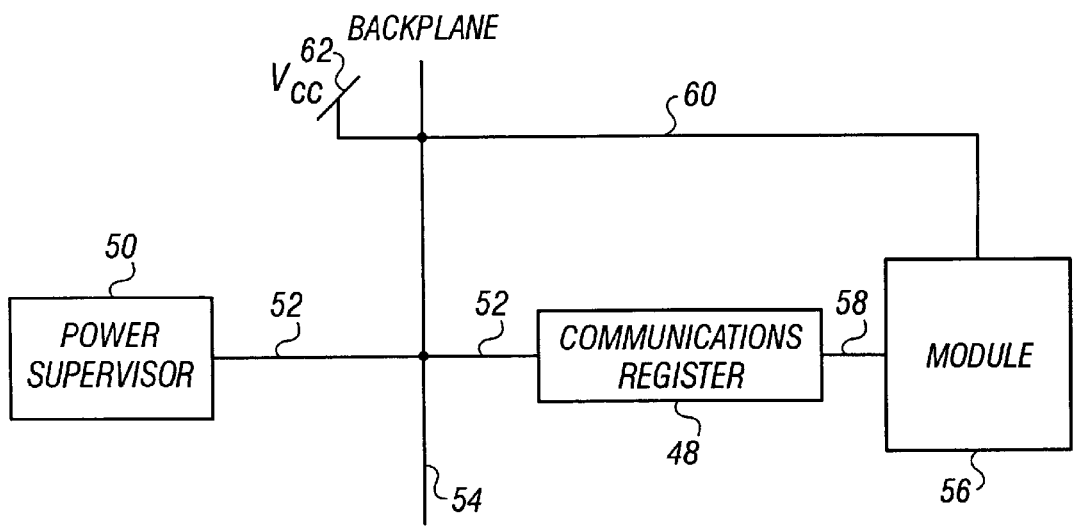
FIG. 3 is a system block diagram of an alternative preferred embodiment of the present invention.
Figure 4:
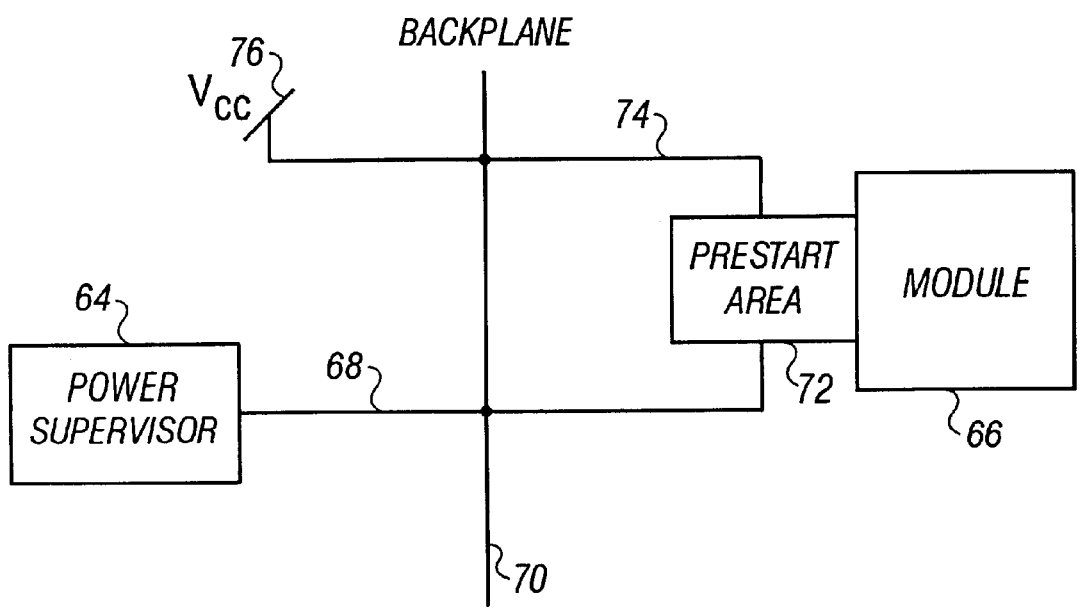
FIG. 4 is a system block diagram of another alternative preferred embodiment of the present invention.

Those of ordinary skill in the art will realize that other components may be used to encode the maximum power demand of module 26 on query conductor 28. For example, capacitors, power supplies, and other elements having unique electrical characteristics capable of being read remotely over a single conductor could be used. Turning to FIGS. 3 and 4, a more sophisticated implementation of the present invention is shown. In FIG. 3 the component is a communications register 48. Power supervisor 50 communicates with communications register 48 over query line 52 which passes through backplane 54. Module 56 also communicates with communications register 48 over line 58. Power supervisor 52 may send messages to module 56 via communications register 48 which is preferably a one-bit wide data communications path. Communications register 48 is preferably a serial register or serial access memory device or the like. Communications from power supervisor 50 to module 56 may include, for example, messages along the lines of "send your maximum power requirement", "send your model type" (so that the power supervisor could determine from its pre-programmed memory what the maximum power demand is), "go ahead and start up", "do not start—maximum power exceeded", and the like. Power may be provided to register 48 and module 56 during this pre-start period via line 60 connected to Vcc 62 through backplane 54 as these devices typically require some minimal amount of power in order to function. This minimal power, however, is negligible relative to the full maximum power requirement of the module 56.

A soft-start circuit along the lines of FIG. 2 (or equivalent) would preferably be incorporated into Module 56. If a "go ahead and start up" signal is received by module 56, the soft-start circuit would be activated to bring the module on line.

FIG. 4 shows a refinement of the embodiment of FIG. 3. In FIG. 4, power supervisor 64 communicates with module 66 over a query line 68 which passes through backplane 70. Module 66 is provided with a prestart area 72. Prestart area 72 is provided with power over line 74 from a backplane connection to Vcc 76. Prestart area 72's circuitry is powered by connection to line 74, but the bulk of the power-consuming circuitry of module 66 remains unpowered until the prestart area 72 receives instructions from power supervisor 64 to turn on module 66. The prestart area 72 may carry on extensive communications with power supervisor 64 and power supervisor 64 may require information in addition to maximum power requirement—for example, a password could be required, or a particular range of serial numbers could be required. The power supervisor 64 could be programmed to disallow the power up of unauthorized devices or devices known to be incompatible with the particular modular electronic system in question. Some of these functions could also be included in the FIG. 3 embodiment.

In accordance with the various preferred embodiments of present invention the connections to a plurality of modules could be carried out with a plurality of query lines, each with a connection to the power supervisor, or with a single conductor connection to the power supervisor multiplexed to the plurality of modules in a conventional manner.

It is intended that the system provided herein would be capable of "hot swapping" of module cards and/or power supply modules. In this manner, the system would be operating and an additional card would be plugged into a slot on the backplane. The power supervisor would detect the insertion of the card in a conventional manner and would query the module to determine if turning it on would exceed power resources available to the system. The system could also work without a "hot swapping" capability.

The term "power" has been used herein but is meant to include current level at a particular voltage, a combined power demand comprising a multiple voltage power demand at various currents, and the like, depending upon the system characteristics. For example, if all power used by the module is at 3.3 V, then the only variable is current. However, if the module uses 3.3 V power as well as 5 V power, those of ordinary skill in the art will readily see how the system described above could easily be expanded to cover a multi-voltage system. While a multiplexing scheme, for example, could be used to scan for a number of different voltage requirements, or different voltage/current combinations could be encoded with a single component, multiple query conductors could also be used, if more convenient.

The power supervisor may itself be a module plugged into the backplane, or it may assume another physical embodiment, as long as it has the required connections to the backplane conductors.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A power management system, comprising:

means for receiving a modular electronic component, the component having an associated known maximum power demand;

means for querying the component, said means for querying having a first end and a second end connected together through said means for receiving, said first end adapted to couple said means for querying to the component; and means for supervising power utilization connected to said means for receiving and to said second end, said means for supervising adapted to query said means for querying and to receive therefrom an associated known maximum power demand of the component, wherein, said means for supervising includes a first voltage source coupled to said means for querying through a first resistance;

said means for supervising senses said associated known maximum power demand by sensing a voltage level on said means for querying, said means for supervising causes a selected voltage level to be applied to said means for querying to cause the component to fully power up, and said means for supervising generates a power up signal which is sent over a line to a switch having a first state and a second state, said switch allowing power to flow onto said means for querying when in said first state and not allowing power to flow onto said means for querying when in said second state, said switch being in said second state in the absence of said power up signal and said switch being in said first state in the presence of said power up signal.

2. A system in accordance with claim 1, wherein said switch includes a transistor having a control gate connected to said line.

3. A power management system for a modular electronic system comprising:

means for receiving a modular electronic component, said component having an associated known maximum power demand;

means for querying the component having a first end and a second end connected together through said means for receiving, said first end adapted to couple said means for querying to the component;

means for supervising attached to said means for receiving and to said second end, said means for receiving adapted to query said means for querying and to receive therefrom an associated known maximum power demand of the component;

means for providing first information indicative of available power resources of the modular electronic system; and means for providing second information indicative of existing power resource utilization of the modular electronic system, wherein the power management system is adapted to compare said first information, said second information and said associated known power demand of the component to determine if sufficient power resources exist to successfully fully power up the component.

4. A power management system for a modular electronic system comprising:

means for receiving a modular electronic component, the component having an associated known maximum power demand;

means for querying the component, said means for querying having a first end and a second end connected together through said means for receiving, said first end adapted to be coupled to the component;

means for supervising attached to said means for receiving and to said second end, said means for supervising adapted to query said means for querying and to receive therefrom an associated known maximum power demand of the component; and means for providing first information indicative of excess power resources of the modular electronic system, wherein, the power management system is adapted to compare said first information and said associated known power demand of the component to determine if sufficient power resources exist to successfully fully power up the component.

5. A system in accordance with claim 4, wherein said means for supervision includes a first voltage source coupled to said means for querying through a first resistance.

6. A system in accordance with claim 5, wherein said means for supervising senses said associated known maximum power demand by sensing a voltage level on said means for querying.

7. A system in accordance with claim 6, wherein said means for supervising causes a selected voltage level to be applied to said means for querying to cause the component to fully power up.

8. A system in accordance with claim 7, wherein said means for supervising generates a power up signal which is sent over a line to a switch having a first state and a second state, said switch allowing power to flow onto said means for querying when in said first state and not allowing power to flow onto said means for querying when in said second state, said switch being in said second state in the absence of said power up signal and said switch being in said first state in the presence of said power up signal.

9. A system in accordance with claim 8, wherein said switch includes a transistor having a control gate connected to said line.

10. A system in accordance with claim 2, wherein said means for supervising further includes a digitizing element coupled to said means for querying for providing a digital representation of said voltage level to said means for supervising.

11. A system in accordance with claim 9, wherein said means for supervising further includes a digitizing element coupled to said means for querying for providing a digital representation of said voltage level to said means for supervising.

12. An electronic modular component for connection to a modular electronic system including a backplane and a power supervisor, said power supervisor having information indicative of remaining uncommitted electronic power resources of said electronic system, said modular component comprising:
    means for indicating a power demand having a first terminal connected to said query node and a second terminal connected to a source of a first voltage, said means for indicating having a value indicative of a known maximum power demand of the electronic modular component, said means for indicating being able to be queried by the power supervisor while the electronic modular component is attached to the backplane; and
    means having a breakdown voltage set to a second voltage, said means having a cathode connected to said query node and an anode operatively connected to a switch, said switch having a first state and a second state, said switch transmitting an enable signal to a power soft start circuit of the electronic modular component when in said first state and not transmitting said enable signal when in said second state, said switch being in said second state in the absence of substantial current flow through said means.

13. An apparatus in accordance with claim 12, wherein means for indicating is a resistor and its value is a resistance.

14. A modular electronic system comprising:
    means for receiving an electronic module having a known maximum power requirement;
    means for supervising connected to said means for receiving;
    means for querying coupling a query node of said electronic module to said means for supervising through said means for receiving;
    means for encoding associated with the electronic module for providing signals to said means for supervising which are indicative of said maximum power requirement, wherein said means for encoding comprises an electrical impedance element, wherein an electrical impedance is selected to correlate with the known maximum power requirement; and
    means for decoding associated with said means for supervising for decoding said signals to determine the said maximum power requirement.

15. A system in accordance with claim 14, wherein said electrical impedance element is a first resistor.

16. A system in accordance with claim 15, wherein said signals which are indicative of the maximum power requirement are voltage signals produced by passing an electric current through said first resistor.

17. A system in accordance with claim 16, wherein said means for decoding comprises a programmed microprocessor.

18. A modular electronic comprising:
    means for receiving an electronic module having a known maximum power requirement;
    means for supervising connected to said means for receiving;
    means for querying coupling a query node of the electronic module and said means for supervising through said means for receiving;
    means for encoding associated with said electronic module for providing signals to said means for supervising which are indicative of the maximum power requirement, said encoding means for encoding comprising a first resistor having a resistance selected to correlate with the known maximum power requirement; and
    means for decoding said signals to determine the maximum power requirement, the signals being voltage signals produced by passing an electric current through said first resistor,
    said first resistor being connected between said query node and a source of a first voltage, and
    the signals being carried over a query conductor passing from the query node through said means for receiving and coupled through a second resistor to a source of a second voltage.

19. A system in accordance with claim 18, wherein a zener diode having a breakdown voltage set to a third voltage intermediate said first voltage and said second voltage has a cathode connected to said query node and an anode operatively connected to a switch, said switch having a first state and a second state, said switch transmitting an enable signal to a power soft start circuit of the electronic module when in said first state and not transmitting said enable signal when in said second state, said switch being in said second state in the absence of substantial current flow through said zener diode.

* * * * *

UNITED STATES PATENT AND TRADEMARK OFFICE
CERTIFICATE OF CORRECTION

PATENT NO. : 6,308,240 B1
DATED : October 23, 2001
INVENTOR(S) : Maurilio Tazi De Nicolo It is certified that error appears in the above-identified patent and that said Letters Patent is hereby corrected as shown below:

Column 1,
Lines 22, 27 and 51, replace "back plane" with -- backplane --.
Line 36, delete "is".

Column 2,
Line 68, delete the second ",".

Column 3,
Line 10, after "serial" insert -- read only memory --.
Line 10, replace "EEPROM" with -- (EEPROM) --.

Column 5,
Line 12, after "of" insert -- the --.
Line 14, delete "out".

Signed and Sealed this

Ninth Day of April, 2002

Attest:

Attesting Officer

JAMES E. ROGAN
Director of the United States Patent and Trademark Office